Figure 1:
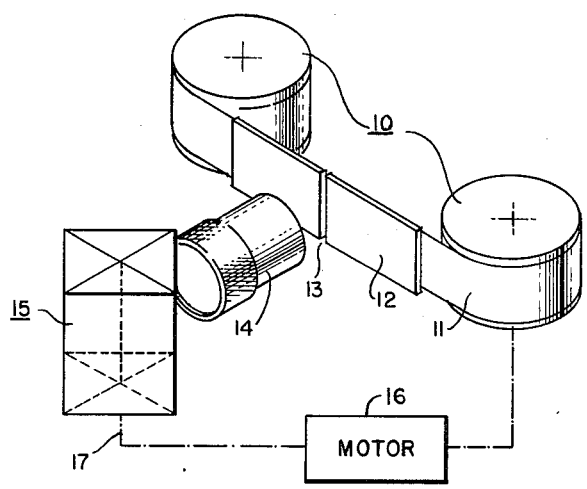

Nov. 16, 1965  R. N. HOTCHKISS  3,217,623
OBJECTIVE OPTICAL SYSTEM FOR CAMERAS
Filed Feb. 17, 1964  3 Sheets-Sheet 1

Nov. 16, 1965 R. N. HOTCHKISS 3,217,623
OBJECTIVE OPTICAL SYSTEM FOR CAMERAS
Filed Feb. 17, 1964 3 Sheets-Sheet 3

United States Patent Office 3,217,623
Patented Nov. 16, 1965

3,217,623
OBJECTIVE OPTICAL SYSTEM FOR CAMERAS
Robert N. Hotchkiss, Plainview, N.Y., assignor to Fairchild Camera and Instrument Corporation, a corporation of Delaware
Filed Feb. 17, 1964, Ser. No. 345,273
10 Claims. (Cl. 95—12.5)

This invention relates to objective optical systems for cameras and particularly to such systems for panoramic cameras designed for aerial photographic reconnaissance.

In aerial photographic reconnaissance, the use of panoramic cameras with optical scanners has found wide application. In such a camera, the film is generally transported past an exposure slit disposed at the focul plane of the camera, an objective lens system focuses the field of view upon the exposure slit, while a rotatable optical scanner, disposed in front of the lens system, permits photographing a panoramic view essentially from horizon-to-horizon, that is, approaching an angle of 180°.

Optical scanners heretofore used with cameras of the type described have generally comprised double-dove scanners, that is, scanners of the type comprising two dove prisms back-to-back with an interface silvered or otherwise made substantially totally reflective. Such a scanner can theoretically cover an angle of view of 360° rotation but, as a practical matter, it is found that only the two forward quadrants are of interest, the back quadrants taking in the sky which it is usually not desired to scan. In any event, the back quadrants are usually either partially or wholly mechanically occluded by the camera and the plane on which it is mounted.

Due to the single reflection of light rays in passing through a dove prism, the angle of scan is twice the angle of rotation so that a rotation of only 90° is required to scan 180°, usually from horizon-to-horizon. During the period when the scanner is viewing the two backward quadrants, no useful photography is usually possible. Therefore, in order to avoid film wastage during one-half of each scanning cycle, the practice has been to move the film intermittently past the exposure slit, arresting the motion of the film during the scanning of the back quadrants. It is well known that, because of the inertia of the rapidly moving film and its transport, apparatus for producing such intermittent film motion at the exposure slit is costly, complex, and weighty.

It is an object of the invention therefore, to provide a new and improved objective optical system for cameras by means of which the above-described limitations on prior art scanners are obviated.

It is another object of the invention to provide a new and improved objective optical system for cameras effective substantially continuously and repetitively to scan the two forward viewing quadrants so that the field of view being photographed is focused upon the film substantially continuously, thereby eliminating either film wastage or complex intermittent film-actuating mechanisms and permitting substantially increased scanning rates.

In accordance with the invention, there is provided an objective optical system for a camera comprising an exposure aperture for disposition adjacent to a film to be exposed, a lens system for focusing a field of view at the aperture, and a view-pointing or view-scanning device disposed in front of the lens system and rotatable relative thereto. The view-pointing or view-scanning device includes $n$ prisms, each having faces forming a dihedral angle of $360°/n$, where $n$ is an even integer greater than 2, corresponding apices of the prisms being disposed substantially at the axis of rotation thereof. The interfaces of the prism assembly are effective to transmit light rays incident thereon at an angle greater than a predetermined angle and to reflect light rays incident thereon at an angle less than such predetermined angle.

For a better understanding of the present invention, together with other and further objects thereof, reference is had to the following description, taken in connection with the accompanying drawings, while its scope will be pointed out in the appended claims.

Figure 2:
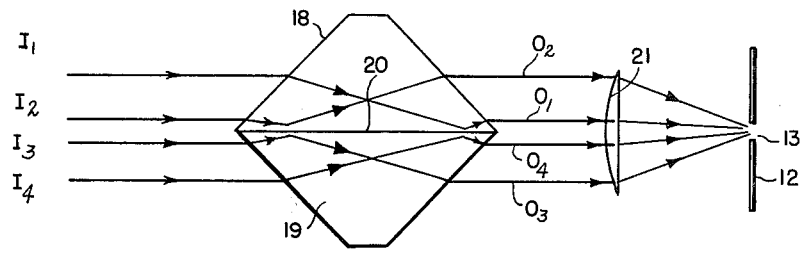
Figure 3:
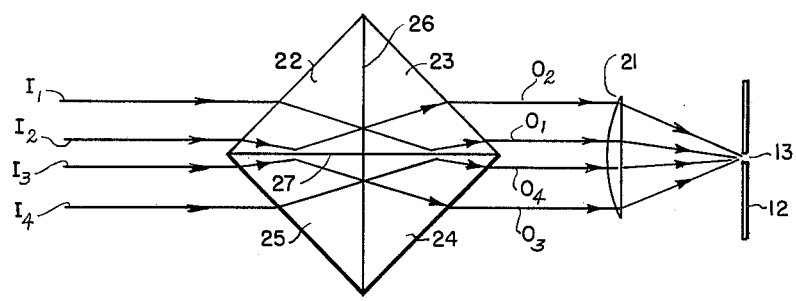
Figure 4:
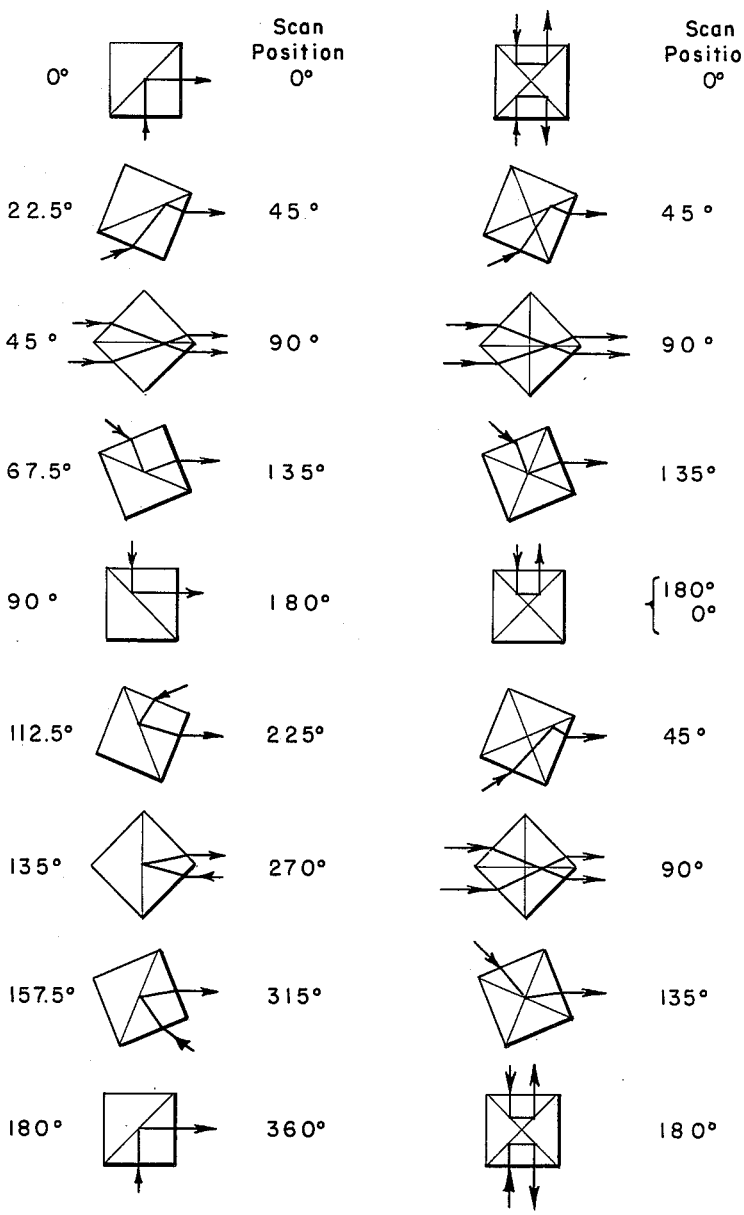
Figure 5:
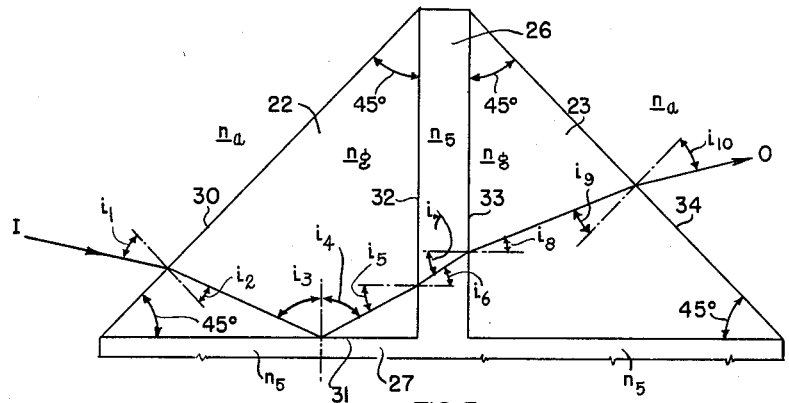
Figure 6:
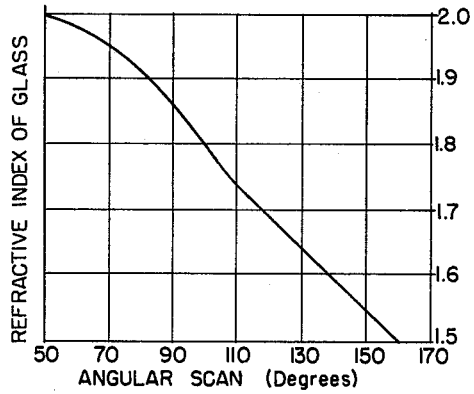
Figure 7:
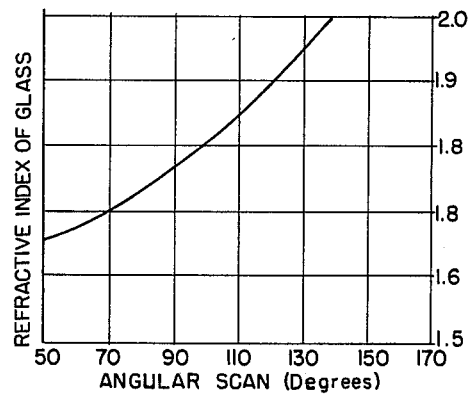
Figure 8:
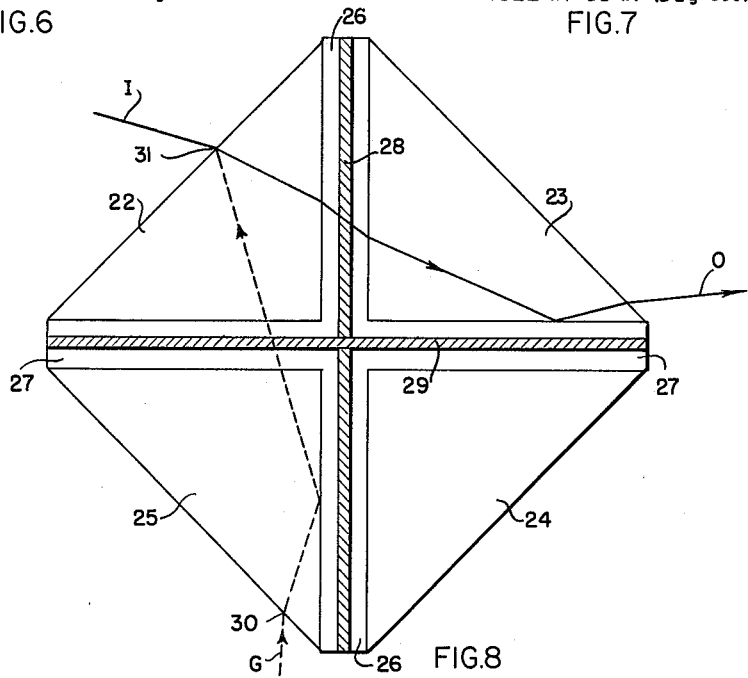

Referring now to the drawings:
FIG. 1 is a schematic perspective view of an objective opetical system for a panoramic camera and the associated elements of the optical system and the film-transporting mechanism;
FIG. 2 is a diagram to explain the operation of the double-dove scanner;
FIG. 3 is a diagram to explain the operation of the optical system of the invention;
FIG. 4 is a schematic comparison of the operation of the double-dove scanner and a scanner embodying the optical system of the invention at various angles of rotation;
FIG. 5 is a schematic diagram of two of the prisms of the optical system of the invention with an exaggerated interface separation for the purposes of explanation;
FIGS. 6 and 7 are graphs representing the scanning characteristics of the objective optical system of the invention in which the interfaces are separated by air and by a transparent optical cement, respectively, while
FIG. 8 is a schematic cross-sectional representation of a modified form of the objective optical system of the invention for eliminating ghosts.

Referring now to FIG. 1 of the drawings, there is represented schematically an objective optical system for a camera, particularly a panoramic focal-plane camera, comprising a film-transport mechanism 10 for transporting a film 11 across the focal plane of the camera, in which is disposed a plate 12 having therein a transverse exposure aperture or slit 13 disposed closely adjacent to the film 11. The apparatus of FIG. 1 also includes a lens system 14 for focusing a field of view at the aperture or slit 13. Disposed in front of the lens system 14 and rotatable relative thereto is a view-scanning device 15, described hereinafter. There is also provided means for actuating the film-transport mechanism 10 and the view-scanning device 15 in synchronism, this means being shown as a conventional motor 16 connected to drive these two devices by suitable linkage represented by the dash line 17.

Before describing in detail the construction and operation of the view-scanning device, it is believed that it would be helpful to describe certain of the fundamental principles on which it is based and the derivation of certain design formulae. In FIG. 2 is schematically represented a double-dove prism scanner comprising a pair of dove prisms 18, 19 arranged back-to-back. Each of the prisms 18, 19 is of trapezoidal form having an acute angle usually approximating 45° and a length depending upon the desired aperture and the index of refraction of the glass. Scanning prisms of this type can be used only for viewing objects at an optically substantially infinite distance so that the incident rays upon the scanner are substantially parallel, as shown by the incident rays $I_1$ to $I_4$.

The paths of the rays through the scanner may be traced by the arrows, the rays emerging as rays $O_1$ to $O_4$, respectively. The interface 20 between the prisms 18 and 19 is silvered or otherwise made substantially totally reflective and each of the rays, in passing through the scanner, impinges upon and is reflected by the interface 20. To aid in tracing the paths of rays through the scanner, the points of reflection are shown slightly spaced from the interface 20 although actually, of course, they will be at that interface. It is to be noted that the emergent rays $O_1$ to $O_4$ are, like the input rays $I_1$ to $I_4$, substantially parallel. These rays are impressed upon a focusing lens 21 which is effective to bring them to a focus at the aperture or slit 13 of plate 12.

In FIG. 3 is schematically represented an objective optical scanner embodying the invention and comprising $n$ prisms, each having faces forming a dihedral angle of $360°/n$, where $n$ is an even integer greater than 2. In the specific embodiment of FIG. 3, the scanning device includes four right-angle prisms 22, 23, 24, and 25, the right-angle apices of these prisms being disposed substantially at the axis of rotation thereof. The prisms 22, 23, 24, and 25 are separated by two planar interfaces 26 and 27 which, in contrast to the interfaces of the double-dove prism assembly of FIG. 2, are not made reflective so that they are effective to transmit light rays incident thereon at an angle to the normal less than a predetermined angle and to reflect light rays incident thereon at an angle to the normal greater than such predetermined angle. It will be noted that the incident light rays $I_1$ to $I_4$ pass through the prism assembly in paths exactly the same as in the double-dove prism assembly of FIG. 2. However, in this arrangement, the interfaces 26 and 27 selectively transmit or reflect the light rays passing therethrough, dependent upon their angle of incidence at the interface.

Consider for example the ray $I_1$ which is incident on the first external air-glass interface and is transmitted therethrough. It is incident upon the interface 26 at an angle to the normal less than the critical and is transmitted substantially totally therethrough. However, it is incident upon the interface 27 at an angle to the normal greater than the critical and is substantially totally reflected. Finally, it is incident upon the second glass-air interface at an angle to the normal less than critical so that it is substantially totally transmitted and emerges as ray $O_1$.

Since the prism assembly of FIG. 3 is substantially symmetrical about its center, obviously if it is rotated through an angle of 90°, the ray paths therethrough are exactly the same which, of course, is not true in the case of the double-dove prism of FIG. 2. Thus, the four right-angle prism assembly of FIG. 3, because of the selective transmission and reflection of rays at the interfaces, depending upon the angle of incidence of the rays at such interfaces, actually simulates a quadruple-dove prism assembly.

The manner in which rays are transmitted through the double-dove prism assembly of FIG. 2 and the simulated quadruple-dove prism assembly of FIG. 3 for various angles of rotation is shown in FIG. 4. As represented in the second and fourth columns of this figure, the double-dove scanner and the quadruple-dove scanner are rotated in increments of 22.5° through 180° of rotation. Due to the doubling of the scanning angle, it is seen that the objective viewing angle or scanning position swings through a double angle or through 360° for the 180° rotation of the scanning device. Due to the symmetry of the scanning devices, rotation through the succeeding 180° will effect a duplication of the ray paths shown for the initial 180°.

In comparing the ray paths of the double-dove scanner of the second column of FIG. 4 with those of the quadruple-dove scanner of the fourth column, it will be noted that in the case of the double-dove scanner, as the prism assembly is rotated through 180°, the scanning angle sweeps through 360° but, for angles of rotation between 90° and 180°, the prism assembly scans the two backward quadrants which, as stated before, are both not useful and are generally occluded by the camera and its supporting mount. On the other hand, in the case of the quadruple-dove scanner, the scanning cycle is repeated for each 90° of rotation, so that the incident rays always come within the scanning positions of 0° to 180° and the two forward quadrants are scanned continuously and successively for each 90° of rotation of the scanning device. Therefore, with such an arrangement, the film-transport mechanism can be operated continuously and, at the same time, there is no wastage of film during the scanning of the two back quadrants.

The formula for determining the design of the objective optical system of the invention may be explained by reference to FIG. 5, which is a schematic representation of two of the prisms 22, 23 of FIG. 3 but in which the interface spaces 26, 27 are greatly exaggerated for clarity of illustration. In fact, if the interface spaces are of air, they should be a few wave lengths of the incident light or a few microns in thickness. It may be assumed that the scanning device is immersed in a medium having an index of refraction $n_a$ which, if air, has a value of approximately 1; the index of refraction of the prisms 22, 23 is $n_g$; and that of the interface medium $n_s$.

The ray I is shown incident at an angle $i_1$ with the normal to the air-glass interface 30. By Snell's Law:

$$\sin i_2 = \frac{n_a}{n_g} \sin i_1 \qquad (1)$$

It should be noted that since $n_a < n_g$, a real value of $i_2$ exists for any value of $i_1$ up to 90°.

The refracted ray is then incident at the interface 31 at an ingle $i_3$ with the normal. The ray will be totally reflected if $i_3$ is greater than the critical angle, i.e., if $$i_3 > \sin^{-1} \frac{n_s}{n_g}$$

otherwise the ray will be refracted. Assuming reflection, $i_4 = i_3$ and the ray will strike the next interface surface 32. The ray will be transmitted at this interface if $i_5$ is less than the critical angle, i.e., if $$i_5 < \sin^{-1} \frac{n_s}{n_g}$$

otherwise total internal reflection will occur.

Assuming transmission, $$\sin i_6 = \frac{n_g}{n_s} \sin i_5$$

and the ray will strike the next interface surface 33. The ray will be transmitted if, at this interface, $i_7$ is less than the critical angle, i.e., if $$i_7 < \sin^{-1} \frac{n_g}{n_s}$$

otherwise total internal reflection will occur. Assuming transmission, $$\sin i_8 = \frac{n_s}{n_g} \sin i_7$$

and the ray will strike the final glass-air interface 34 at an angle $i_9$. Assuming transmission through this interface, $$\sin i_{10} = \frac{n_g}{n_a} \sin i_9$$

Since $$i_3 - i_2 = 45°$$
$$i_4 + i_5 = 90°$$
$$i_6 = i_7$$

and $$i_8 + i_9 = 45°$$

the above relationships can be combined to show that $$i_1 = i_{10}$$

The total angular deviation of the ray is seen to be $90° - 2i_1$.

In the above analysis, two assumptions were made, namely:

$$i_3 > \sin^{-1} \frac{n_s}{n_g}$$

$$i_5 < \sin^{-1} \frac{n_s}{n_g}$$

Since $$i_5 = 90° - i_4 = 90° - i_3$$

these expressions can be written as:

$$i_3 > \sin^{-1} \frac{n_s}{n_g} \quad (2)$$

$$i_3 > 90° - \sin^{-1} \frac{n_s}{n_g} \quad (3)$$

It is seen that the minimum usable value of $i_3$ is determined by relation (2) if $$\sin^{-1} \frac{n_s}{n_g}$$

is greater than 45° or by relation (3) if less than 45°.

The two conditions can be written as:

$$i_1 > \sin^{-1} \left[ \frac{n_g}{n_a} \sin \left( \sin^{-1} \frac{n_s}{n_g} - 45° \right) \right] \quad (4)$$

$$i_1 > \sin^{-1} \left[ \frac{n_g}{n_a} \sin \left( 45° - \sin^{-1} \frac{n_s}{n_g} \right) \right] \quad (5)$$

Considering practical values of the indexes $n_a$, $n_g$, and $n_s$, it can be assumed $n_a$=index of refraction of air $\simeq 1$. The index $n_s$ may be either that of air or the index of optical cement $\simeq 1.5$. The range of indices of refraction of presently available optical glasses is approximately 1.5 to 2, in which case the value of the critical angle $i_3$ is less than 45°. Applying condition (4) and assuming that the interface separation is air, it can be shown by basic optical principles that the maximum total scan angle A is given by the expression:

$$A = 180° - 4 \sin^{-1} \left[ \frac{\sqrt{2}}{2} (1 - \sqrt{n_g^2 - 1}) \right] \quad (6)$$

It is to be noted that the scan angle calculated from Equation 6 is obtained only for a slit of infinitesimal width. In an actual camera configuration, the scan angle will be less by an amount equal to the angle subtended by the slit at the objective lens. FIG. 6 is a graph of the total scan angle versus index of refraction of the prisms computed from Equation 6.

On the other hand, if the interfaces of the prism assembly are separated by a film of optical cement having an index of refraction $n_s$ less than that of the prisms, for example of the order of 1.5, the critical value of the angle $i_3$ will be greater than 45° and again it can be shown by basic optical principles that the total maximum scan angle $A_1$ for this condition is represented by the expression:

$$A_1 = 180° - 4 \sin^{-1} \left[ \frac{\sqrt{2}}{2} (n_c - \sqrt{n_g^2 - n_c^2}) \right] \quad (7)$$

The relationship of Equation 7 is shown graphically in FIG. 7 of the drawings for an interface cement having an index of refraction of 1.5 and prisms of glasses having indices of refraction in the range 1.5 to 2. It is evident from a comparison of FIGS. 6 and 7 that the scan angle of the embodiment utilizing an interface optical cement is not as large as in the case with an air gap interface. However, by the use of a suitable optical cement having an index of refraction less than 1.5, scan angles intermediate between those of FIG. 6 and FIG. 7 may be provided. The cemented construction is desirable from mechanical considerations. Optical cement suitable for the foregoing application may be any cement having appropriate optical characteristics and physical characteristics compatible with the environment in which the equipment is to be used. One such suitable cement is Canada balsam.

As the index of refraction $n_s$ of the cement decreases from the value 1.5, the maximum scan angle is increased in the same sense. On the other hand, it is noted that, with the use of glasses of higher refractive indices, the use of optical cement in the interface spaces yields a greater maximum scan angle than air.

It has previously been shown (Design and Fire Control Optics, Ordnance Corps Manual ORD M2-1, 1952, page 302) that, for any given linear aperture B, the dimension D of the diagonal of the prism assembly of FIG. 3 is given by the relation:

$$D = \frac{B}{2} \left\{ \frac{\sqrt{n_g^2 - \sin^2 45°} + \sin 45°}{\sqrt{n_g^2 - \sin^2 45°} - \sin 45°} + 1 \right\} \quad (8)$$

During the development of the objective optical system of the invention, it was discovered that, on occasion, troublesome ghost images appeared. The origin of such ghosts may be explained by reference to FIG. 8, in which the four right-angle prisms 22, 23, 24, and 25 are separated by interface spaces 26, 27, shown greatly exaggerated for clarity of illustration and assumed to be separated by films of transparent optical material 28, 29, described hereinafter. The path of an input ray I through the prism assembly to the emerging output ray O is shown in solid line. Assume that a ray G, shown in dotted lines, is incident upon the prism 25 at the point 30. Its path through the prisms 25 and 22 is also shown in dotted lines and it is shown to strike the air-glass interface of prism 22 at the point 31 at which the ray I is incident with an angle of incidence equal to the angle of the refracted incident ray I, so that these two rays become coincident. Rays such as ray G will, therefore, give rise to a ghost image superimposed on the desired image produced by the rays such as I. Since the ghost image results from a Fresnel reflection at an air-glass interface at less than the critical angle, its intensity is relatively weak, as compared to the primary image, and it can be still further reduced by application of anti-reflection coatings to the external surfaces of the prisms 22, 23, 24, and 25. Such anti-reflection coatings are well known in the art and include such materials as magnesium fluoride ($MgF_2$) and silicon dioxide ($SiO_2$). However, the residual ghost images may, in certain applications, still be troublesome.

The ghost images described can be substantially completely eliminated by disposing, in the interface spaces, thin layers or films 28 and 29 of transparent plane-polarizing material such as plastic nitrocellulose packed with ultra-microscopic crystals of iodo-sulphate of quinine with their optic axes all parallel and commercially available as Sheet Polaroid type HN24. The material of the layer 28 is given a predetermined orientation while that of layer 29 is given an orientation normal thereto, that is, their planes of polarization are at right angles to one another. With this arrangement, it will be noted that the ray G, after passing through the layer 29, will be plane-polarized in a direction at right angles to the transmission characteristic of the layer 28 and will, therefore, be stopped at that layer. This selective suppression of ghost images is due to the fact that such ghost rays necessarily pass through both of the interface layers 28 and 29 in sequence, while the desired signal ray passes through only a single one of the layers. The polarizing material of the layers 28 and 29 is preferably so oriented that the planes of polarization are either perpendicular or parallel to the plane of FIG. 8 to avoid the production of circularly polarized light at the external glass-air interface.

While there have been described what are, at present, considered to be the preferred embodiments of the invention, it will be obvious to those skilled in the art that various changes and modifications may be made therein, without departing from the invention, and it is therefore aimed in the appended claims to cover all such changes and modifications as fall within the true spirit and scope of the invention.

What is claimed is:

1. An objective optical system for a camera comprising:
   (a) an exposure aperture for disposition adjacent to a film to be exposed;
   (b) a lens system for focusing a field of view at said aperture;
   (c) and a view-pointing device disposed in front of said lens system and rotatable relative thereto;
   (d) said view-pointing device including $n$ prisms, each having faces forming a dihedral angle of $360°/n$, where $n$ is an even integer greater than 2, corresponding apices of said prisms being disposed substantially at the axis of rotation thereof;
   (e) and the interfaces of said prism assembly being effective to transmit light rays incident thereon at an angle greater than a predetermined angle and to reflect light rays incident thereon at an angle less than said predetermined angle.

2. An objective optical system for a panoramic focal-plane camera comprising:
   (a) an exposure slit for disposition adjacent to a film to be exposed;
   (b) a lens system for focusing a field of view at said slit;
   (c) and a view-scanning device disposed in front of said lens system and rotatable relative thereto;
   (d) said scanning device including $n$ prisms each having faces forming a dihedral angle of $360°/n$, where $n$ is an even integer greater than 2, corresponding apices of said prisms being disposed substantially at the axis of rotation thereof;
   (e) and the interfaces of said prism assembly being effective to transmit light rays incident thereon at an angle greater than a predetermined angle and to reflect light rays incident thereon at an angle less than said predetermined angle.

3. An objective optical system for a panoramic focal-plane camera comprising:
   (a) an exposure slit for disposition adjacent to a film to be exposed;
   (b) a lens system for focusing a field of view at said slit;
   (c) and a view-scanning device disposed in front of said lens system and rotatable relative thereto;
   (d) said scanning device including four right-angle prisms, corresponding apices of said prisms being disposed substantially at the axis of rotation thereof;
   (e) and the interfaces of said prism assembly being effective to transmit light rays incident thereon at an angle greater than a predetermined angle and to reflect light rays incident thereon at an angle less than said predetermined angle.

4. An objective optical system for a panoramic focal-plane camera comprising:
   (a) an exposure slit for disposition adjacent to a film to be exposed;
   (b) a lens system for focusing a field of view at said slit;
   (c) and a view-scanning device disposed in front of said lens system and rotatable relative thereto;
   (d) said scanning device including four right-angle prisms, corresponding apices of said prisms being disposed substantially at the axis of rotation thereof;
   (e) the surfaces of said prisms at said interfaces being uncoated;
   (f) and the interfaces if said prism assembly being effective to transmit light rays incident thereon at an angle greater than a predetermined angle and to reflect light rays incident thereon at an angle less than said predetermined angle.

5. An objective optical system for a panoramic focal-plane camera comprising:
   (a) an exposure slit for disposition adjacent to a film to be exposed;
   (b) a lens system for focusing a field of view at said slit;
   (c) and a view-scanning device disposed in front of said lens system and rotatable relative thereto;
   (d) said scanning device including $n$ prisms, each having faces forming a dihedral angle of $360°/n$, where $n$ is an even integer greater than 2, corresponding apices of said prisms being disposed substantially at the axis of rotation thereof;
   (e) and the adjacent interfaces of said prism assembly being separated by an air space of the order of a few wave lengths of the incident light.

6. An objective optical system for a panoramic focal-plane camera comprising:
   (a) an exposure slit for disposition adjacent to a film to be exposed;
   (b) a lens system for focusing a field of view at said slit;
   (c) and a view-scanning device disposed in front of said lens system and rotatable relative thereto;
   (d) said scanning device including $n$ prisms, each having faces forming a dihedral angle of $360°/n$, where $n$ is an even integer greater than 2, corresponding apices of said prisms being disposed substantially at the axis of rotation thereof;
   (e) and the adjacent interfaces of said prism assembly being separated by an air space of the order of a few microns.

7. An objective optical system for a panoramic focal-plane camera comprising:
   (a) an exposure slit for disposition adjacent to a film to be exposed;
   (b) a lens system for focusing a field of view at said slit;
   (c) and a view-scanning device disposed in front of said lens system and rotatable relative thereto;
   (d) said scanning device including four right-angle prisms, corresponding apices of said prisms being disposed substanially at the axis of rotation thereof;
   (e) and the interfaces of said prism assembly being separated by a film of transparent cement having an index of refraction less than that of said prisms.

8. An objective optical system for a panoramic focal-plane camera comprising:
   (a) an exposure slit for disposition adjacent to a film to be exposed;
   (b) a lens system for focusing a field of view at said slit;
   (c) and a view-scanning device disposed in front of said lens system and rotatable relative thereto;
   (d) said scanning device including four right-angle prisms, corresponding apices of said prisms being disposed substantially at the axis of rotation thereof;
   (e) one pair of aligned interfaces of said prism assembly being separated by a film of transparent plane-polarizing material having a predetermined orientation;
   (f) and the other pair of aligned interfaces being separated by a film of transparent plane-polarizing material oriented in a plane normal to that between the other interfaces.

9. An objective optical system for a panoramic focal-plane camera comprising:
   (a) an exposure slit for disposition adjacent to a film to be exposed;
   (b) a lens system for focusing a field of view at said slit;
   (c) and a view-scanning device disposed in front of said lens system and rotatable relative thereto;
   (d) said scanning device including $n$ prisms, each having faces forming a dihedral angle of $360°/n$, where $n$ is an even integer greater than 2, corresponding apices of said prisms being disposed substantially at the axis of rotation thereof;
(e) the external surfaces of said prisms having an anti-reflection coating;
(f) and the interfaces of said prism assembly being effective to transmit light rays incident thereon at an angle greater than a predetermined angle and to reflect light rays incident thereon at an angle less than said predetermined angle.

10. In a camera, the combination comprising:
(a) a film-transport mechanism;
(b) an exposure slit for disposition adjacent to a film to be exposed;
(c) a lens system for focusing a field of view at said slit;
(d) a view-scanning device disposed in front of said lens system and rotatable relative thereto;
(e) said scanning device including $n$ prisms, each having faces forming a dihedral angle of $360°/n$, where $n$ is an even integer greater than 2, corresponding apices of said prisms being disposed substantially at the axis of rotation thereof;
(f) and the interfaces of said prism assembly being effective to transmit light rays incident thereon at an angle greater than a predetermined angle and to reflect light rays incident thereon at an angle less than said predetermined angle;
(g) and means for actuating said film-transport mechanism and said view-scanning device in synchronism.

References Cited by the Applicant
UNITED STATES PATENTS

| | | |
|---|---|---|
| 2,505,819 | 5/1950 | Wrigley. |
| 2,719,457 | 10/1955 | Tripp. |
| 2,754,718 | 7/1956 | Rock et al. |
| 2,942,514 | 6/1960 | Brandon. |

JOHN M. HORAN, *Primary Examiner.*